United States Patent
Daugherty et al.

(10) Patent No.: US 6,345,292 B1
(45) Date of Patent: *Feb. 5, 2002

(54) WEB PAGE RENDERING ARCHITECTURE

(75) Inventors: Brian R. Daugherty, Bellevue; Marc T. Beck, Redmond; Donald J. Clore, Seattle, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,127

(22) Filed: Dec. 3, 1998

(51) Int. Cl.[7] ............................................ G06F 15/167
(52) U.S. Cl. ........................ 709/214; 709/219; 707/513
(58) Field of Search ................................ 707/200, 513; 711/118, 122; 709/217, 218, 219, 212, 213, 214, 215, 216

(56) References Cited

U.S. PATENT DOCUMENTS

| | | | | |
|---|---|---|---|---|
| 5,740,430 A | * | 4/1998 | Rosenberg et al. | 707/200 |
| 5,761,662 A | | 6/1998 | Dasan | |
| 5,913,033 A | * | 6/1999 | Grout | 709/219 |
| 5,924,116 A | * | 7/1999 | Aggarwal et al. | 711/122 |
| 5,933,849 A | * | 8/1999 | Srbljic et al. | 711/118 |
| 5,983,227 A | * | 11/1999 | Nazem et al. | 709/217 X |
| 6,192,382 B1 | * | 2/2001 | Lafer et al. | 707/513 |
| 6,293,402 B1 | * | 7/2001 | Ronstrom et al. | 711/131 |
| 6,278,449 B1 | | 8/2001 | Sugiarto et al. | |

OTHER PUBLICATIONS

Anawat Chankhunthod et al., A Hierarchial Internet Object Cache, Computer Science Department of University of Southern California, 11 pages, Nov. 1995.*

Evangelos P. Markatos et al., A Top–10 Approach to Prefetching the Web, INET 98, 15 pages, Jul. 1998.*

Ton Verschuren et al., Web Caching Meshes: Hit or Miss?, INET 98, 17 pages, Jul. 1998.*

* cited by examiner

Primary Examiner—Patrice Winder
(74) Attorney, Agent, or Firm—Banner & Witcoff, Ltd.

(57) ABSTRACT

An architecture for rendering web pages. In one embodiment, a system including a first server, a first-level cache, a second server, a second-level cache and one or more provider objects. The first server receives a request from a requestor for a web page. The web page has a number of clips in an arrangement. The server determines the clips and the arrangement based on a key. The first-level cache stores the clips from which the first server is to assemble the web page. The second server populates the first-level cache with any of the clips not yet stored there. The second-level cache stores the clips from which the second server is to populate the first-level cache. The provider object or objects populate the second-level cache with any of the clips not yet stored there.

21 Claims, 4 Drawing Sheets

WEB PAGE RENDERING ARCHITECTURE

FIELD OF THE INVENTION

This invention relates generally to web pages, and more particularly to a rendering architecture for web pages.

BACKGROUND OF THE INVENTION

With the growing popularity of the Internet and Internet-type technologies such as intranets, there has come a realization that users are interested in receiving personalized information via these technologies. For example, whereas before a user may have requested a web page from a web site such as http://www.msn.com that may have returned the same information regardless of the identification of the user, now the user may desire more specific information. For example, a user may desire the information returned from a given weather page to be relevant to the user's location. As another example, a user may desire that the information returned from a technical support page be relevant to only the applications installed on the user's computer.

Delivery of personalized web pages by a web site generally requires other considerations for the architecture of web site as compared to non-personalized web pages. For example, the rendering of personalized web pages on the Internet desirably needs to be fast and scalable, like other web sites. However, potentially unlike other web sites, it should also desirably be easy to modify the look or presentation of the web site daily or weekly. In addition, it should desirably be easy to modify the look or presentation based on the identification of the user. This makes the development of such web site architectures more difficult.

Current Internet or intranet services that intend to provide personalized and personally relevant content to users usually use server-side scripting, server-side objects (such as what are known as Common Gateway Interface (CGI) programs), as well as other methodologies. However, server-side scripting is expensive computationally speaking, because of run-time parsing and interpretation that must be performed for every request. In addition, objects are often instantiated and released repeatedly, which reduces performance, and the code itself is intermingled with display elements in Hyper-Text Markup Language (HTML) format, which makes maintenance more difficult.

Still other methodologies include reliance on database look-ups and attempts to cache previous function calls and the content returned from those calls. However, any server-side code that relies upon database look-ups as part of their rendering process for web pages generally is also costly, and does not scale well. Previous attempts to cache function calls and the content returned therefrom have frequently been hampered by too much complexity and were generally not amenable to being scaled.

For these and other reasons, there is a need for the present invention.

SUMMARY OF THE INVENTION

The invention provides for an architecture for rendering web pages. In one embodiment, a system includes a first server, a first-level cache, a second server, a second-level cache and one or more provider objects. The first server receives a request from a requester for a web page. The web page has a number of clips in an arrangement. The server determines the clips and the arrangement based on a key. The first-level cache, which is at the first server, stores the clips from which the first server is to assemble the web page. The second server populates the first-level cache with any of the clips not yet stored there. The second-level cache, which is at the second server, stores the clips from which the second server is to populate the first-level cache. The provider object or objects are at the second server, and populate the second-level cache with any of the clips not yet stored there.

The invention provides for advantages not found in the prior art. In one embodiment, the key is based on information supplied by the user, such that the information returned is personalized based thereon. Content may be constantly updated from different sources, by interface with the provider objects. High performance is obtained in part by caching commonly used page fragments, which may be assembled in different ways depending on the key. The architecture is extensible and maintainable because suppliers of contents can easily be added or modified, by adding or modifying the provider objects. Furthermore, the modification of content by adding, changing, or removing suppliers of content does not typically require the redevelopment of other components of the system. Types of personalization also can be easily added or modified.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method in accordance with an embodiment of the invention is described. Finally, in the fourth section, a conclusion of the detailed description is provided.

Hardware and Operating Environment

Figure 1:
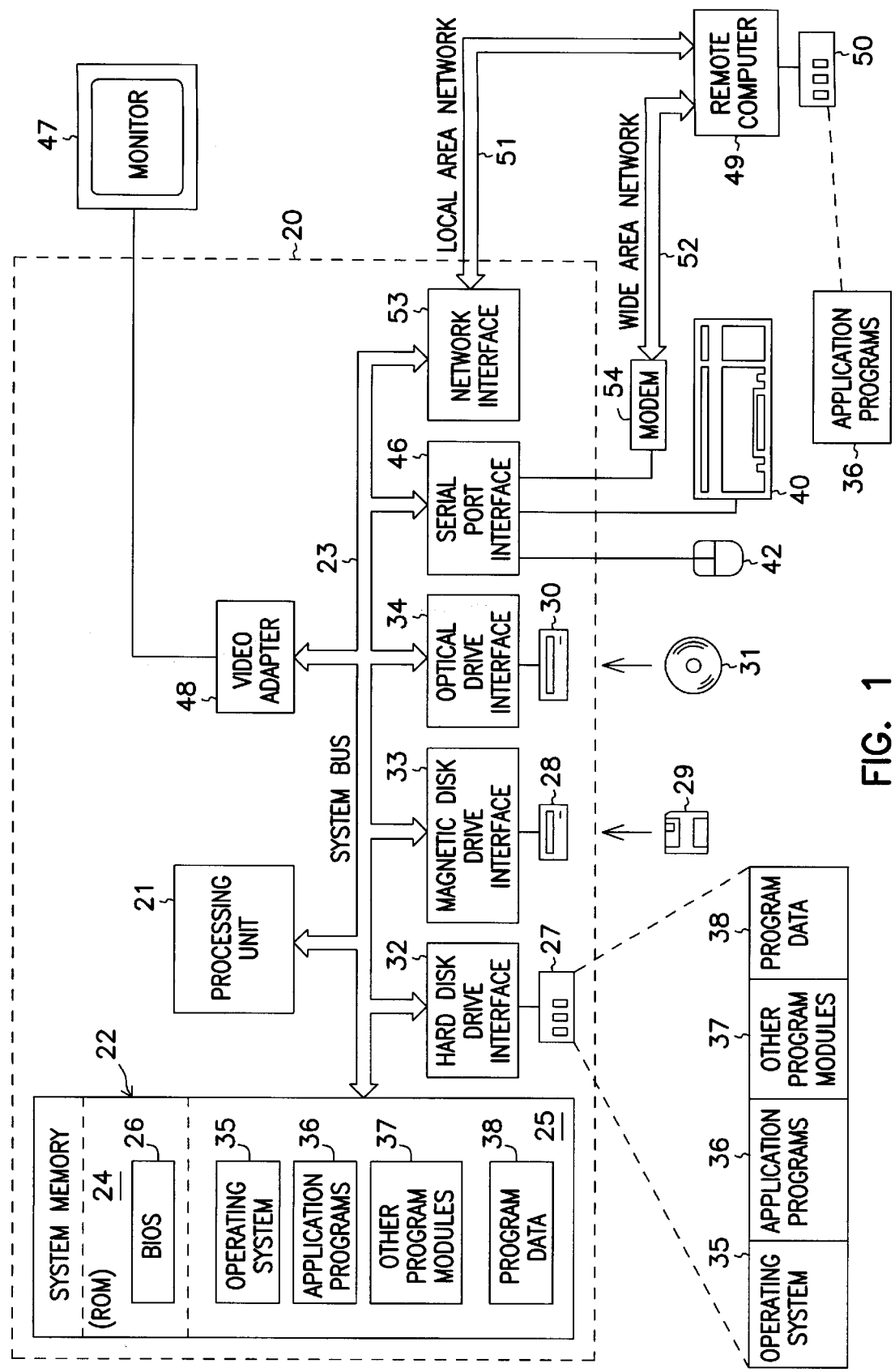
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
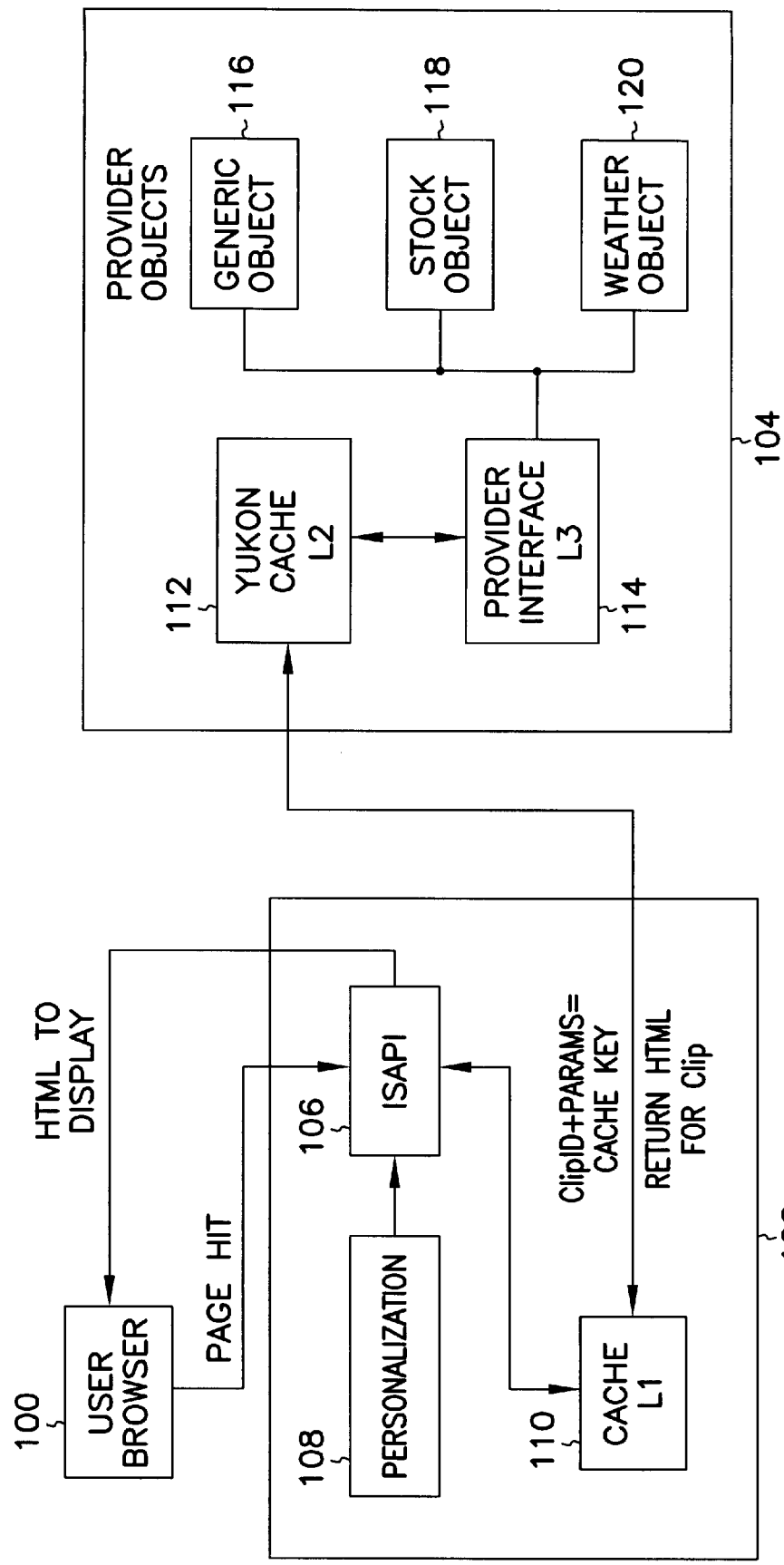
FIG. 2 shows a block diagram of a system according to one embodiment of the invention.

In this section of the detailed description, a description of a system, according to an embodiment of the invention is provided. The description is provided by reference to FIG. 2 and FIG. 3. Referring now to FIG. 2, a system according to an embodiment of the invention is shown. The system includes a user browser 100, a first server 102, and a second server 104. The first server 102 receives a request from the user browser 100 for a web page. The user browser 100 is thus a requester (the user of the browser 100 may also be considered the requester). The user browser 100 is connected to the first server 102 in one embodiment by an Internet technology, such as the Internet, an intranet, etc. The user browser 100 is a computer program or other technology that is able to display web pages, such as the Microsoft Internet Explorer browser.

The web page requested by the user browser 100 is identified by a Universal Resource Locator (URL) address. In one embodiment, the web page is made up of a number of HyperText Markup Language (HTML) clips, in a given arrangement. The first server 102 determines the clips and the arrangement for the web page based on a key identified in FIG. 2 as personalization 108. In one embodiment, the key is derived by the server 102 from a local file stored at the requester, as well as the web page requested by the requestor. The local file may be what is known in the art as a cookie file, which is read by the browser 100 on the local PC (the requestor), and sent to the server 102 in the cookie portion of an HTTP header, as part of a web page GET request, as known within the art. Furthermore, the web page requested by the requestor is itself identified by its Universal Resource Locator (URL) address. The server 102 has an Internet Server Application Programming Interface (ISAPI) 106 and a first-level cache 110. The ISAPI 106, based on the web page requested and the personalization 108, assembles HTML clips (i.e., it determines the necessary HTML clips specified by the personalization 108) as stored in the first-level cache 110 according to the arrangement specified by the personalization 108 and the web page requested. As it receives the HTML clips, or in another embodiment once all the HTML clips have been retrieved, the server 102 returns them to the user browser 100 for display thereon. The server 102 may also return the completed web page.

This personalization in one embodiment occurs as follows. Depending on the URL address of the web page requested, the ISAPI 106 references a data structure in extensible Markup Language (XML) format that specifies different HTML clips for that web page. Furthermore, the cookie file stored by the user browser 100 determines which of those HTML clips are to be used to return to the user browser 100. The XML data structures may be cached.

Therefore, personalization data is retrieved from the cookie file, or in another embodiment a personalization identification (such as GUID, as known within the art), that enables the ISAPI 106 to retrieve the user's personalization data from a server-side store (as may be cached by the cache 110 or another cache that will be described). The personalization data is used to determine which categories and clips are shown on the custom page being built, the order in which categories and clips are displayed, and the contents of those clips that are personalized. Thus, a weather clip may display the local weather forecast, depending on the user's zip code. Based on the cache-key built using a parameter description contained in the XML data structure (the specific XML data structure used based on the web page URL), and the personalization data, the clips are requested from the first-level cache 110. In one embodiment, the cache key contains the following information: the identification of the provider, and name value pair parameters that communicate sufficient information to the provider object so that it is able to generate the HTML clip. The XML description of the web pages makes the architecture of the invention in one embodiment easily extensible. The XML describes parameters and how to look them up for a given user request. This information is passed to one or more caches and in one embodiment to a provider object and possibly eventually to a provider object, which contain preformed HTML clips corresponding to the cache request. That is, the caches contain pre-formed HTML clips, while the provider objects generate these clips from HTML templates and raw data. Thus, changes in the XML allow the system to easily add or remove content providers, or change the personalization parameters being used for a given content provider.

The first-level cache at the first server 102 thus stores the clips from which the first server 102 is to assemble the web page. In one embodiment, the caching scheme is a high-performance distributed cache. Desirably, the caching system is efficient, such that search time is decreased, the ability to handle higher peak load per machine is increased, and the cost per search is reduced (indicating high locality within the cache). Also desirably, the caching scheme is fast, robust (having a minimum number of external failures resulting in the failure of the cache), complete (such that all highly recurring query results are stored), current (no item stays in the cache longer than a given time limit, unless otherwise specified), intelligent (having flexible caching policies), and reusable (that is, scalable). In one particular embodiment, the caching scheme is based on a threading model, such that multiple user threads are allowed. In addition, the caching scheme utilizes an indexing model known in the art as a direct-chained caching model; the cache content has a limited lifetime (record expiration model); the caching scheme is also based on a record access model providing for record protection (locking) when multiple threads add, read, delete and update index entries in parallel; and, the caching scheme utilizes data compression; the cache has very intensive heap memory use. The invention is not necessarily so limited, however.

If a particular clip requested by the ISAPI 106 is not in the first-level cache 110, the cache 110 requests the clip from the second server 104. The second server 104 therefore populates the first-level cache with any of the clips not yet stored at the first-level cache. The second server 104 includes a second-level cache 112, a third-level provider interface 114, as well as one or more provider objects, such as a generic object 116, a stock object 118, and a weather object 120.

The second-level cache 112 stores the clips from which the second server 104 is to populate the first-level cache 110 of the first server 102. The cache 112 provides a service that responds to requests from the server 102 when clips are requested that are not in the first-level cache 110. The cache 112 then returns clips. In one embodiment, the caching scheme is a high-performance distributed cache, as has been described. That is, desirably, the caching scheme is efficient, such that search time is decreased, the ability to handle higher peak load per machine is increased, and the cost per search is reduced (indicating high locality within the cache). Also desirably, the caching scheme is fast, robust (having a minimum number of external failures resulting in the failure of the cache), complete (such that all highly recurring query results are stored), current (no item stays in the cache longer than a given time limit, unless otherwise specified), intelligent (having flexible caching policies), and reusable (that is, scalable).

In one particular embodiment, the caching scheme is based on a threading model, such that multiple user threads are allowed. In addition, the caching scheme utilizes an indexing model known in the art as a direct-chained caching model; the cache content has a limited lifetime (record expiration model); the caching scheme is also based on a record access model providing for record protection (locking) when multiple threads add, read, delete and update index entries in parallel; and, the caching scheme utilizes data compression; the cache has very intensive heap memory use.

However, if a particular clip requested by the first server 102 is not in the second-level cache 112, either, then the cache 112 requests the clip from the provider interface 114. The provider interface 114 maps the clip requested to the correct provider object. Each provider object at the second server 104 thus populates the second-level cache 112 with any of the clips not yet stored at the second-level cache 112. Therefore, the interface 114 may direct the clip request to a generic object 116, a stock object 118, or a weather object 120, in the embodiment of FIG. 2, although the invention is not necessarily so limited.

Once a provider object returns the HTML clip requested to the provider interface 114, the clip is stored in the second-level cache 112, provided to and also stored in the first-level cache 110, and ultimately provided to the ISAPI 106. Therefore, when the ISAPI 106 requests an HTML clip, three situations may occur. If the cache 110 has the clip stored therein, it immediately returns the clip to the ISAPI 106. If the cache 110 does not have the clip, but the cache 112 does, then the cache 112 returns the clip to the cache 110, which stores the clip and returns it to the ISAPI 106. If neither cache has the clip, then the provider interface 114 obtains the clip from one of the provider objects, returns it to the cache 112 where the clip is stored, and the cache 112 provides it to the cache 110, which also stores the clip and returns it to the ISAPI 106.

In some situations, there is a need for the content (that is, the HTML clips) as stored in the cache 110 and the cache 112 to be updated. This is in one embodiment provider-object driven. Thus, the provider interface 114 receives a message from a provider object that the content stored in the cache 112 is outdated, and the interface 114 removes the old information from the cache.

In another embodiment, a provider object tells the provider interface 114 which directories/files it wants to know about that may change. Then the provider interface 114 listens to file change notifications and signals each provider object if it previously told the provider interface 114 that it cares about a particular file. At this time, the provider object reinitializes itself and may indicate (if content truly has changed) to provider interface 114 that content has changed.

In either embodiment, the cache 112 then notifies the cache 110 of the first server 102 that the content needs to be updated, and cache 110 also removes the old information from the cache. Thus, the next time this clip is requested, it is generated by a provider object, and repopulated through the caches 112 and 110. In other words, the second-level cache may periodically notify the first-level cache that one or more clips stored at the first level cache are outdated, such that they are deleted from the first-level cache.

Scalability is provided by embodiments of the invention. While only one first server 102 and one second server 104 are shown in FIG. 2, there may be many first servers 102 to a given second server 104. There may also be many second servers 104. In this manner, servers may be added as needed for performance and other reasons. The first server 102 may be considered part of a first level to receive a request from a requester for a web page having a plurality of clips in an arrangement, where the first level determines the clips and the arrangement based on a key, and caches the clips from which the web page is assembled. The second server 104 may be considered part of a second level to populate the first level with any of the clips not yet cached by the first level and to cache the clips from which the first level is populated.

Furthermore, scalability and extensibility is provided by the ability to add new provider objects, and new parsers in the content fetcher for those provider objects, without requiring any of the already existing provider objects and/or parsers to be rewritten in any manner. This is an advantage of the invention, insofar as modification of a given web personalization architecture can be made later —thus, the initial architecture does not have to be rigidly defined a priori. In other words, the system of an embodiment of the invention may be scalable and extensible in that there may be more than one provider object and/or parser, such that not all of the provider objects and/or parsers are present in the system when it is first configured. The later-added provider objects and/or parsers can be added to the system without requiring redevelopment or changing of the already present provider objects and/or parsers. In one embodiment, the provider objects and parsers can be Component Object Model (COM) objects, although the invention is not so limited.

Figure 3:
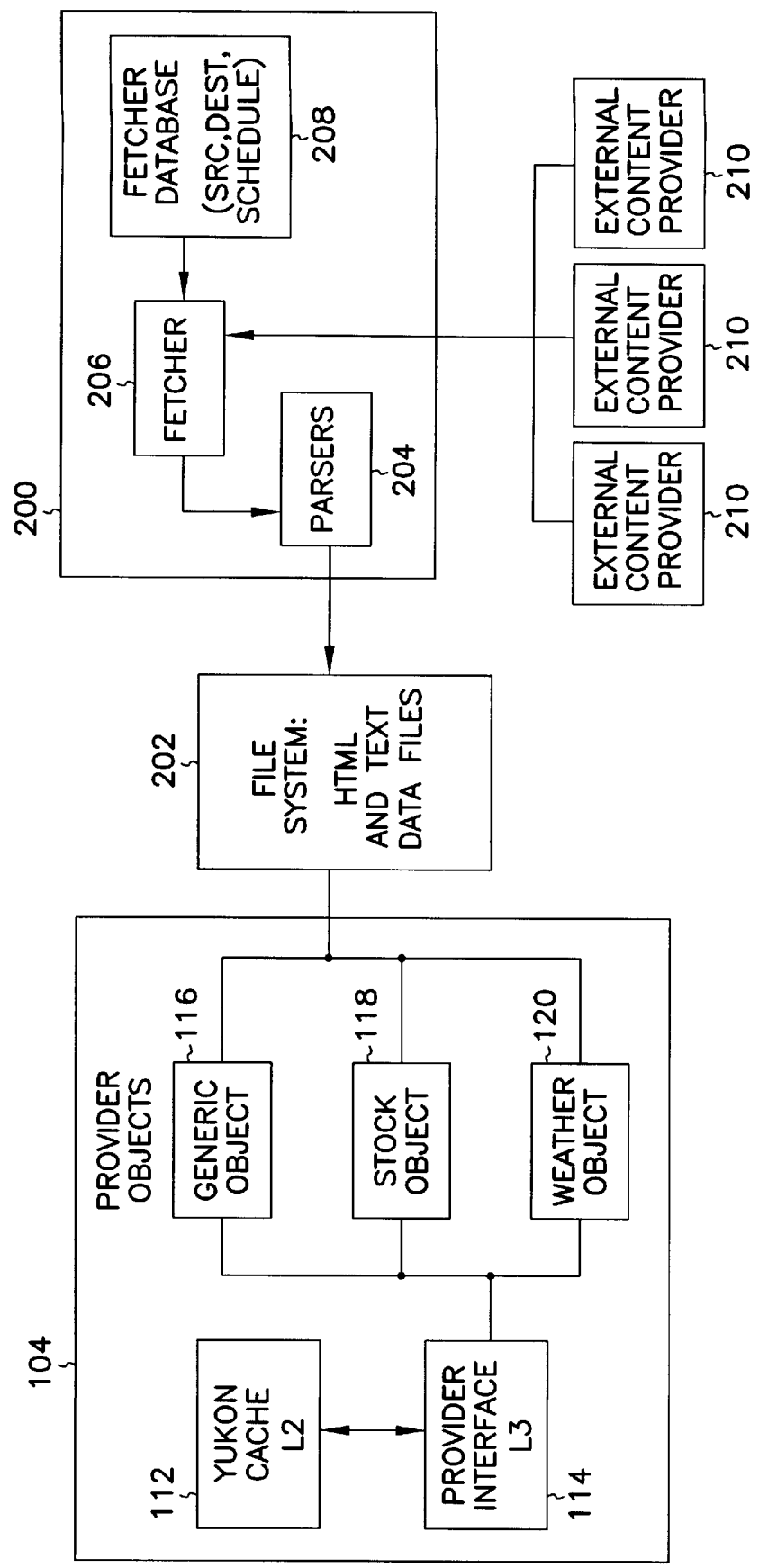
FIG. 3 shows a block diagram of a part of a system according to one embodiment of the invention in more detail; and, FIG. 4 shows a flowchart of a method according to an embodiment of the invention.

Referring next to FIG. 3, a part of a system according to an embodiment of the invention is shown in more detail. The second server 104, as in FIG. 2, is again shown, with constituent parts the second-level cache 112, the provider interface 114, and the provider objects 116, 118 and 120. Reference to FIG. 3 is made to describe the manner by which the objects 116, 118 and 120 retrieve data and/or generate HTML clips, which are then provided to the interface 114. The operation of the second server 104, the second-level cache 112, and the provider 114 in FIG. 3 is consistent with that as has been described in conjunction with FIG. 2.

The provider objects 116, 118 and 120 of FIG. 3 include a generic object 116, and two particular objects, the stock object 118 and the weather object 120. The invention is not necessarily limited to any given number of provider objects, nor a type of provider objects. The particular objects are specific objects particular to a given type of data from which a clip is generated.

The provider objects utilize the cache-key, and generate the HTML clip corresponding to this key from data provided by the content fetcher 200. In one embodiment, this is accomplished with a mapping file, one or more files containing HTML fragments, and the data files delivered by the content fetcher 200. The mapping file allows for the key to be mapped to the correct HTML files on disk without this mapping being built into the provider object itself, to support easy modification and extensibility without code redevelopment. In one embodiment, provider objects may be restricted in how long they take to respond, since a user (requestor) may have to wait while the clip is being built (e.g., a duration of four milliseconds or shorter).

The generic object 116 uses in one embodiment a mapping file, HTML files, and text data files delivered by the content fetcher 200. The generic object 116 is utilized for many content providers, which will be described. The mapping file provides sufficient flexibility for the object 116 to be used, for example, for all news headline providers, sports headline or sports score providers, as such providers are known within the art, and other content providers that have a small well-defined set of XML data files that can be merged into preauthored HTML fragments. Given the key, the object 116 is able to return the requested clip.

The stock object 118 in one embodiment directly retrieves information from a financial information server, maintains an internal cache of at least some requested stock and securities data, and uses HTML files and data merging to produce HTML sub-clips for an individual stock quote. The XML file describes how then to assemble a provider header, a body of one or more stock sub-clips, and a provider footer, to maximize the cacheability of the stock data, given the large number of permutations that may be found in user stock lists. In one embodiment, the stock object does not use the fetcher. The weather object 120 in one embodiment uses a mapping file, HTML files, and text data files delivered by the content fetcher 200. Thus, given a requestor's location (for example, by zip code), the object 120 is able to return a clip containing a weather forecast for that area.

Thus, in the general case, the provider objects interface with the content fetcher 200 via the file system 202. The file system 202 is the storage space for the HTML, text and data files, such as a hard drive of a computer, although the invention is not so limited. The content fetcher 200 provides the provider objects with data from which any of the clips not yet stored at the second-level cache 112 are generated. It also supplies updates to content for clips that already have been stored at the second-level cache 112 and first level cache 110. The content fetcher includes parsers 204, a fetcher 206, and a fetcher database 208.

The parsers 204 are in one embodiment objects, which parse the information retrieved by the fetcher 206, and generate text data files and/or HTML files to be stored in the file system 202 for retrieval and use by the provider objects. The parsers 204 may be generic or specialized. Furthermore, parsers may be added to extend the system without any other components requiring redevelopment, which is an advantage of the invention. The fetcher 206 retrieves information from the external content providers 210 based on a set schedule set in the database 208, where the schedule in one embodiment is independent of requests from provider objects. The fetcher 206 may determine based on the fetcher database 208 that a previously provided HTML clip now stored in one of the caches is out-of-date, and will fetch new data from an external content provider, providing (or, pushing) this information to the appropriate provider object via the appropriate parser 204 and the file system 202.

Each of the external content providers 210 can in one embodiment be a different web site providing the raw data fetched by the fetcher 206 and parsed by the parser 204. Each of these content providers is thus to provide the content fetcher 200 with a specific part of the data from which clips not yet stored at the second-level cache (or, outdated clips) are generated. In one embodiment of the invention, a third level may be considered that includes at least one of the provider interface 114, the provider objects 116, 118 and 120, the content fetcher 200, and the external content providers 210.

Method

In this section of the detailed description, methods according to an embodiment of the invention is presented. This description is provided in reference to FIG. 4. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Figure 4:
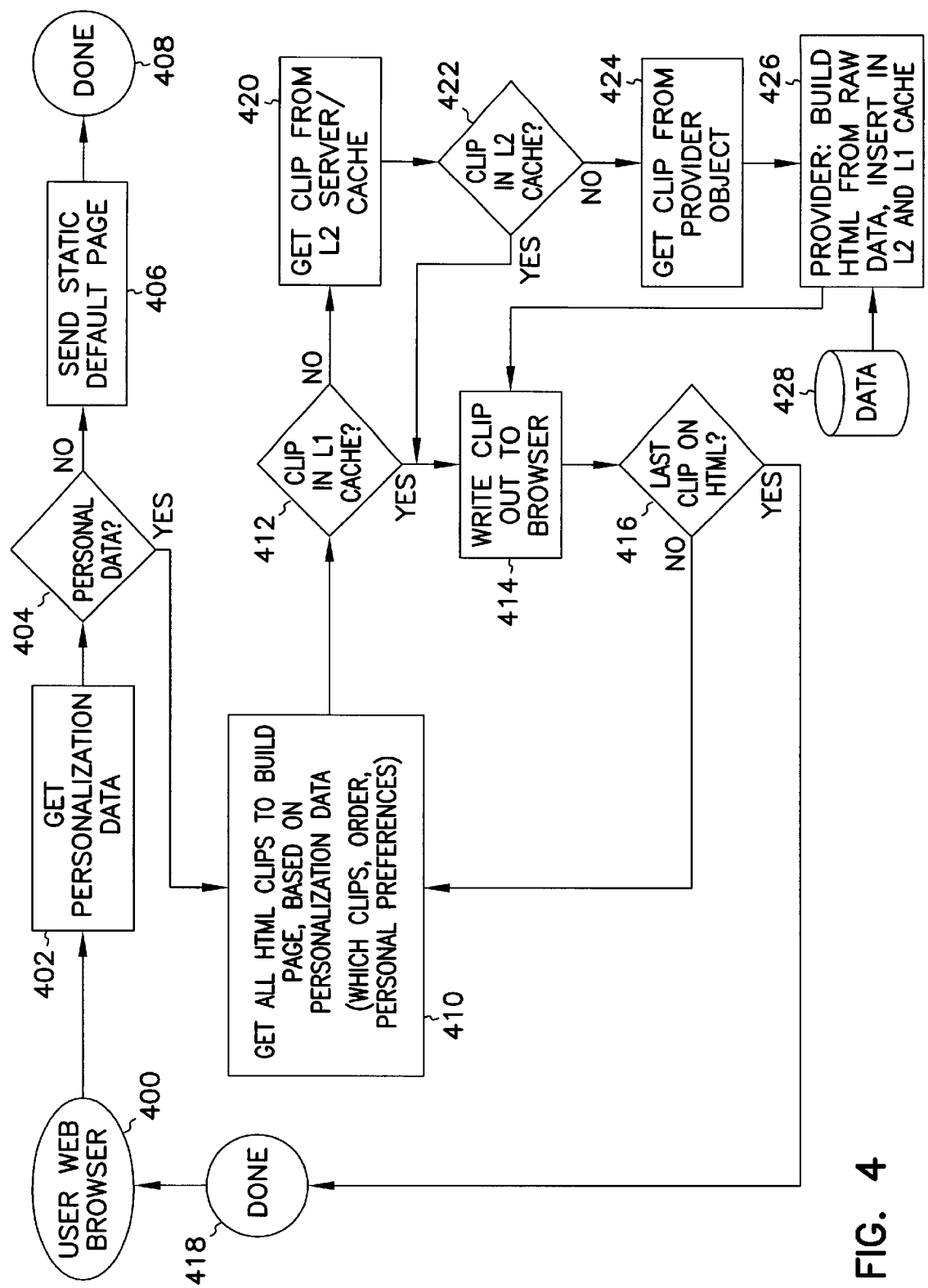

Referring now to FIG. 4, a method according to an embodiment of the invention is shown. In 400, a user web browser (i.e., a requester) requests a desired web page. In 402, it is determined whether any personalization data exists for this requester. For example, in an embodiment of the invention where such data is stored in cookie files on the requester computer, the option exists to turn off cookie files, such that no personalization information can be stored. In such an instance, a static default web page is returned to the requester in 406, and the method is finished in 408. Furthermore, 406 and 408 are proceeded to in the case of a new user, who has not yet had an opportunity to personalize the service, or in the case of a returning user, who has decided not to personalize the service. In 410, all the clips necessary to build the web page are assembled according to an arrangement. Thus, a key based on a local file stored at the requester as well as the desired web page requested by the requestor is derived, and the necessary plurality of clips and the arrangement thereof is determined based on the key. For each of the clips, first in 412, it is determined whether the clip is stored in a first level cache. If it is, then in 414 the clip is returned to the requester, positioned as determined by the arrangement. If it is the last clip, then the method proceeds from 416 to 418, where the method ends, until the requester requests another web page at 400.

If, however, a clip is not in the first-level cache, then in 422 it is determined whether the clip is stored in a second-level cache. If it is, then the clip is inserted into the first level cache (not specifically shown in the figure), and the method proceeds from 422 to 414, where the clip is written out to the requester browser, as has been described. If the clip is not in the second-level cache, however, then in 424 the clip is obtained, for example, from a third level including a provider object. This is accomplished by the provider building the HTML clip in 426 from data identified in FIG. 4 as 428. The clip is then inserted into both the first-level and the second-level cache, and the clip is written out to the requester browser in 414, as has been described.

Conclusion

An architecture for rendering web pages has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system comprising:
   a first server to receive a request from a requester for a web page having a plurality of clips in an arrangement, the first server determining the clips and the arrangement based on a key;
   a first-level cache at the first server to store the clips from which the first server is to assemble the web page;
   a second server to populate the first-level cache with any of the clips not yet stored at the first-level cache;
   a second-level cache at the second server to store the clips from which the second server is to populate the first-level cache; and,
   at least one provider object at the second server to populate the second-level cache with any of the clips not yet stored at the second-level cache.

2. The system of claim 1, further comprising:
- a content fetcher to provide the at least one provider object with data from which the any of the clips not yet stored at the second-level cache are generated; and,
- a plurality of content providers, each to provide the content fetcher with a specific part of the data from which the any of the clips not yet stored at the second-level cache are generated.

3. The system of claim 2, wherein the content fetcher comprises:
- a fetcher to fetch data from a data source; and,
- at least one parser to parse the data fetched by the fetcher into a format expected by the parser object that translates the data into an HTML clip.

4. The system of claim 3, wherein the content fetcher further comprises at least one second parser, added to the system at a point in time later than the at least one parser, such that addition of the at least one second parser does not require redevelopment of code of any of the at least one parser.

5. The system of claim 1, wherein the key is derived from a local file stored at the requester, and the web page requested by the requester.

6. The system of claim 5, wherein the local file comprises a cookie file.

7. The system of claim 1, wherein the second-level cache at the second server is to periodically notify the first-level cache at the first server that one or more of the clips stored on the first-level cache are outdated, such that the one or more of the clips are deleted from the first-level cache.

8. The system of claim 1, wherein the at least one provider object comprises at least one generic object and at least one specific object particular to a given type of data from which a clip is generated.

9. The system of claim 1, wherein each of the at least one provider object comprises a mapping file for configuration of the object, such that changing the mapping file results in reconfiguration of the object without redevelopment of code of the object.

10. The system of claim 1, further comprising at least one second provider object, added to the system at a point in time later than the at least one provider object, such that addition of the at least one second provider object does not require redevelopment of code of any of the at least one provider object.

11. A system comprising:
- a first level to receive a request from a requester for a web page having a plurality of clips in an arrangement, the first level determining the clips and the arrangement based on a key and to cache the clips from which the web page is assembled;
- a second level to populate the first level with any of the clips not yet cached by the first level and to cache the clips from which the first level is populated; and,
- a third level to populate the second level with any of the clips not yet cached by the second level.

12. The system of claim 11, wherein the first level comprises a first server and a first-level cache at the first server.

13. The system of claim 11, wherein the second level comprises a second server and a second-level cache at the second server.

14. The system of claim 11, wherein the third level comprises at least one provider object.

15. The system of claim 11, wherein the third level comprises a content fetcher to provide data from which any of the clips not yet stored at the second level are generated.

16. The system of claim 15, wherein the third level further comprises a plurality of content providers, each to provide the content fetcher with a specific part of the data from which the any of the clips not yet stored at the second level are generated.

17. The system of claim 11, wherein the second level is to periodically notify the first level that one or more of the clips cached by the first level are outdated, such that the one or more of the clips are deleted from the first level.

18. A method comprising:
- determining a plurality of clips and an arrangement thereof to generate a desired web page;
- for each of the plurality of clips:
  - determining whether the clip is stored in a first-level cache;
  - upon determining that the clip is not stored in the first level cache,
  - determining whether the clip is stored in a second-level cache;
  - upon determining that the clip is not stored in the second-level cache,
    - obtain the clip;
    - store the clip in the second-level cache;
  - store the clip in the first-level cache; and,
- return the clip, positioned as determined by the arrangement.

19. The method of claim 18, wherein determining a plurality of clips and an arrangement thereof to generate a desired web page comprises:
- receiving a request from a requestor for the desired web page;
- deriving a key; determining the plurality of clips and the arrangement thereof based on the key.

20. The method of claim 19, wherein deriving a key comprises deriving a key based on a local file stored at the requester, and the desired web page requested by the requester.

21. A computer-readable medium having a computer program stored thereon for execution on a computer, the program performing a method comprising:
- receiving a request from a requester for a desired web page;
- deriving a key based on a local file stored at the requester, and the desired web page requested by the requester;
- determining the plurality of clips and the arrangement thereof based on the key;
- for each of the plurality of clips:
  - determining whether the clip is stored in a first-level cache;
  - upon determining that the clip is not stored in the first level cache,
    - determining whether the clip is stored in a second-level cache;
    - upon determining that the clip is not stored in the second-level cache,
      - obtain the clip;
      - store the clip in the second-level cache;
  - store the clip in the first-level cache; and,
- return the clip, positioned as determined by the arrangement.

* * * * *

UNITED STATES PATENT AND TRADEMARK OFFICE
CERTIFICATE OF CORRECTION

PATENT NO.     : 6,345,292 B1
DATED          : February 5, 2002
INVENTOR(S)    : Brian Daugherty et al.

It is certified that error appears in the above-identified patent and that said Letters Patent is hereby corrected as shown below:

<u>Column 10,</u>
Line 54, "requester" has been replaced with -- requestor --,

<u>Column 11,</u>
Line 22, "requester" has been replaced with -- requestor --,
Line 23, "requester" has been replaced with -- requestor --,
Line 47, "requester" has been replaced with -- requestor --, <u>Column 12,</u>
Line 39, "requester" has been replaced with -- requestor --,
Line 40, "requester" has been replaced with -- requestor --,
Line 44, "requester" has been replaced with -- requestor --,
Line 57, "requester" has been replaced with -- requestor --,
Line 58, "requester" has been replaced with -- requestor --.

Signed and Sealed this

Third Day of December, 2002

JAMES E. ROGAN
*Director of the United States Patent and Trademark Office*